US005640411A

United States Patent [19]
Bochum et al.

[11] Patent Number: 5,640,411
[45] Date of Patent: Jun. 17, 1997

[54] WAVEGUIDE LASER

[75] Inventors: Hansjoerg Bochum, Stuttgart; Markus Jung, Bruchsal, both of Germany

[73] Assignee: Deutsche Forschungsanstalt fuer Luft-und Raumfahrt e.V., Bonn, Germany

[21] Appl. No.: 554,789

[22] Filed: Nov. 7, 1995

Related U.S. Application Data

[63] Continuation of PCT/EP95/00797, Mar. 4, 1995.

[30] Foreign Application Priority Data

Mar. 8, 1994 [DE] Germany ............ 44 07 710.6

[51] Int. Cl.⁶ .................................... H01S 3/03
[52] U.S. Cl. .................. 372/64; 372/19; 372/95; 372/99; 372/108
[58] Field of Search ............... 372/64, 19, 95, 372/99, 108, 23, 92, 103

[56] References Cited

U.S. PATENT DOCUMENTS

| | | | |
|---|---|---|---|
| 3,577,094 | 5/1971 | Tomlinson | 372/99 |
| 4,498,184 | 2/1985 | O'Meara | 372/92 |
| 4,887,885 | 12/1989 | Durnin et al. | 372/103 |
| 5,245,619 | 9/1993 | Kronberg | 372/99 |
| 5,454,004 | 9/1995 | Leger | 372/99 |

*Primary Examiner*—Leon Scott, Jr.
*Attorney, Agent, or Firm*—Barry R. Lipsitz

[57] ABSTRACT

A waveguide laser comprises a laser-active medium, a pump source for the laser-active medium and a resonator with a waveguide extending in an axial direction and formed from a cylindrical, outer optical waveguide surface and a cylindrical, inner optical waveguide surface. A resonator radiation field extends substantially parallel to the axial direction between the outer and inner optical waveguide surfaces. The waveguide laser further comprises two cavity mirrors between which the resonator radiation field extends and of which at least a first mirror comprises successive maximum and minimum reflectivity values in a direction azimuthal to the axial direction. The maximum and minimum reflectivity values of the first cavity mirror, viewed in the azimuthal direction, are arranged at the location of maximum and minimum intensities of a selected azimuthally closed mode of the resonator, which mode is enclosed by the resonator radiation field. Intermediate regions, in which the reflectivity is between the maximum and minimum values, extend in the azimuthal direction between the successive maximum and minimum values.

24 Claims, 10 Drawing Sheets

WAVEGUIDE LASER

This application is a continuation of International PCT Application No. PCT/EP95/00797, filed on Mar. 4, 1995.

The invention relates to a waveguide laser, comprising a laser-active medium, a pump source for the laser-active medium and a resonator with a waveguide extending in an axial direction, formed from a cylindrical, outer optical waveguide surface and a cylindrical, inner optical waveguide surface, between which surfaces a resonator radiation field extends substantially parallel to the axial direction, and also comprises two cavity mirrors, between which the resonator radiation field extends and of which at least a first mirror comprises successive maximum and minimum reflectivity values in a direction azimuthal to the axial direction.

The term "cylindrical" not only covers circular cylindrical forms but also any desired cross-section, and moreover, it is not absolutely essential that the waveguide surfaces are arranged coaxially to one another.

Such a waveguide laser is known, for example, from the German Patent Application 42 03 225.

The first mirror in this waveguide laser is constructed so that it has reflective segments and output apertures between the reflective segments, and the reflective segments and output apertures alternate with one another constantly. The result of this is that a very high, but undefined, mode stimulates oscillation by virtue of the high azimuthal Fresnel number.

Moreover, the disadvantage of the known solution is that the output apertures are defined by mirror edges causing diffraction effects to occur there which are evident in the output laser radiation as a negative effect. For this reason, phase-correcting elements must be incorporated for homogenisation of the far field.

The object of the invention is to provide a waveguide laser in which a selective specific mode stimulates oscillations.

This object is achieved in accordance with the invention with a waveguide laser of the aforementioned type in that the maximum and minimum values of the reflectivity of the first cavity mirror, viewed in azimuthal direction, are arranged at the location of maximum intensity values and minimum intensity values of a selected azimuthally closed mode of the resonator, said mode being enclosed by the resonator radiation field; and that intermediate regions, in which the reflectivity lies between the maximum value and the minimum value, extend in the azimuthal direction between the successive maximum values and minimum values.

The advantage of the solution according to the invention is therefore that as a result of a defined arrangement of the maximum and minimum reflectivity values and the intermediate regions, the mode stimulating oscillations in such a waveguide laser according to the invention may be selectively defined so that there are also defined phase conditions present in the output laser radiation.

In the simplest case, it is provided that the reflectivity in the intermediate regions has intermediate values forming at least one step.

To provide a transition between the maximum values and minimum values, and vice versa, which is adapted as far as possible to the intensity curve of the selected mode, it is preferred that the reflectivity in the intermediate regions has intermediate values which decrease in a transition from one of the maximum values to one of the minimum values, or increase in the transition from one of the minimum values to one of the maximum values.

This is preferably achieved if the intermediate values form successive steps with either decreasing or increasing intermediate values.

The advantage of graduated intermediate values in the intermediate regions is that such stepped changes in reflectivity are technically simple to achieve. However, the disadvantage of the steps is that they again produce diffraction phenomena and therefore have a detrimental effect on the phase of the outgoing laser radiation.

For this reason, it is particularly advantageous if the intermediate reflectivity values continuously decrease or continuously increase in the intermediate regions.

In the simplest case, the intermediate values decrease with a constant slope or increase with a constant slope, with respect to the azimuthal direction. This enables a trapezoidal or triangular reflectivity profile, for example, to be formed.

However, it is even more advantageous if the intermediate values constantly decrease or constantly increase. Such variations in the intermediate values may be achieved in the intermediate regions in particular when the intermediate values follow a constantly varying function, e.g. a periodic function.

It is preferred in this case that the locations of the maximum values and the locations of the minimum values lie at the maximum values and minimum values of the periodic function.

An optimum selection may be achieved when the reflectivity has the same curve in the azimuthal direction as the intensity of the selected mode of the resonator.

In the simplest case, one example of the solution according to the invention provides that the reflectivity is constant in the radial direction.

A particularly advantageous embodiment provides that the maximum values and minimum reflectivity values of the first cavity mirror, viewed in the radial direction, are arranged at the location of the maximum intensities and minimum intensities of the selected mode.

It is particularly favourable here if radial intermediate regions, in which the reflectivity is located between the maximum value and the minimum value, extend in radial direction between the successive maximum values and minimum values.

It is additionally advantageous if the reflectivity in the radial intermediate regions has intermediate values forming at least one step.

An even better mode selection can be achieved when the reflectivity in the radial intermediate regions has intermediate values, which decrease in a transition from one of the maximum values to one of the minimum values or increase in the transition from one of the minimum values to one of the maximum values.

The simplest way of achieving this is if the intermediate values form successive steps.

However, it is even more advantageous if the intermediate values decrease or increase continuously.

This can be achieved, for example, by intermediate values which decrease or increase with a constant slope, or even better by intermediate values decreasing or increasing constantly.

The optimum case is where the reflectivity curve in the radial direction is such that it corresponds to the intensity curve of the selected mode in the radial direction.

Preferably, with such a configuration of the first cavity mirror, the laser radiation output occurs from the resonator radiation field in the intermediate regions, since an intensity of the resonator radiation field mode other than zero is still present in these regions and, moreover, the reflectivity is less than the maximum value so that the selected mode can form essentially undisturbed.

In this case, it is possible, for example, that the maximum reflectivity value of the first cavity mirror is more than 80%, preferably more than 90%, and in particular almost 100%.

The minimum reflectivity value is preferably selected to be less than 25%, and preferably less then 10%.

However, it is also possible, in addition, to output laser radiation in the region of the maximum intensity so that the maximum reflectivity value is more than 60%, and preferably more than 70%, and therefore the first cavity mirror still allows laser radiation to exit from the resonator radiation field in the region of the maximum value of its reflectivity.

No further details have been given thus far with regard to the structure of the mirrors. Therefore, an advantageous embodiment provides that the first mirror comprises a substrate, onto which a high-index dielectric is applied as a layer, in which case the reflectivity may be varied by variation of the thickness of the layer.

Since the problem in particular with a high-index dielectric is that it leads to phase distortions varying in the azimuthal direction, it is preferred that the first mirror is provided with a phase-compensating layer which compensates a phase distortion on the basis of the varying reflectivity.

Similarly, no further details have been given as regards the structure of the second cavity mirror. Therefore, an advantageous embodiment provides that the second cavity mirror is a fully reflecting mirror.

However, to allow introduction of an additional selection criterion with respect to mode selection, it is of further advantage if the second cavity mirror has high-loss regions at the location of minimum intensity values of the selected mode.

No further details have been given with respect to the laser-active medium in conjunction with the previous explanations of the invention. Therefore, an advantageous embodiment provides that the laser-active medium is a gas.

This gas is preferably $CO_2$ under the conditions usual for $CO_2$.

It is additionally advantageous if the pump source for stimulation of the laser-active medium has a high-frequency source so that the laser-active medium, in particular the gas, is stimulated via a high-frequency excitation means.

However, it is also possible according to the invention to provide a solid instead of a gas as laser-active medium. In this case, the waveguide surfaces can be formed by the outer surfaces of the solid.

In this case, a light source which stimulates the solid is provided as the pump source for the laser-active medium. All known solid-state laser materials, e.g. Nd yag etc., may be used as solid.

Further features and advantages of the invention are given in the following description as well as in the illustration of some embodiments of the invention.

Figure 1:
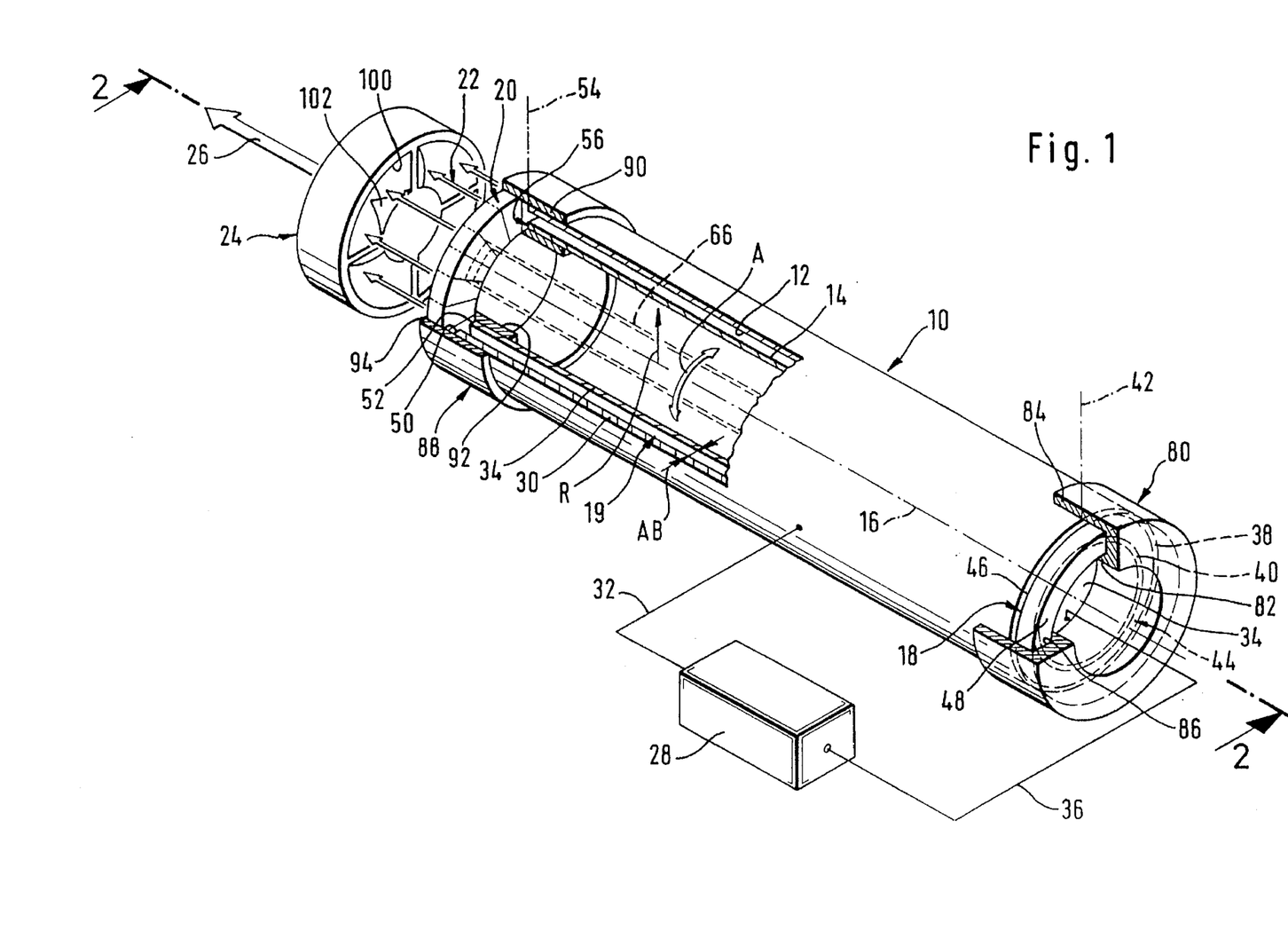
FIG. 1 is a perspective view of a first embodiment of the solution according to the invention.

A first embodiment shown in FIG. 1 of a laser according to the invention comprises a waveguide given the overall reference 10, formed by an outer cylindrical waveguide surface 12 and an inner cylindrical waveguide surface 14, both arranged, for example, coaxially to a cylinder axis 16.

The cylinder-shaped optical waveguide 10 serves to guide the laser radiation by reflection back and forth between the waveguide surfaces 12 and 14 essentially in the direction of the cylinder axis 16 between a first cavity mirror 18 and a second cavity mirror 20 of a laser resonator 19, each arranged close to a front face of the waveguide 10.

The first cavity mirror 18 is fully reflecting, whereas the second cavity mirror 20 is an output mirror, from which a laser beam bundle 22 exits in a cylinder-like shape around the cylinder axis 16. The laser beam bundle 22 is recombined by imaging optics, e.g. focussing optics or e.g. an axicon, to a laser beam bundle 26 coaxial to the cylinder axis 16 which has a smaller diameter than laser beam bundle 22.

A high-frequency source 28, which causes a gas discharge radially to the cylinder axis 16 in the waveguide 10 through suitable electrode arrangements, is used to stimulate a laser-active medium, preferably a laser gas, e.g. $CO_2$ at usual pressure for $CO_2$, arranged in the waveguide 10. In the simplest case, the walls supporting the waveguide surfaces 12 and 14 form the electrodes, as described above. However, it is also possible to provide separate electrodes. In the simplest case, the laser gas is not circulated but is merely cooled by surges onto the cooled waveguide surfaces 12 and 14.

Alternatively, it is also possible to use a solid material as laser-active medium, which is preferably pumped by a pump light source.

Figure 2:
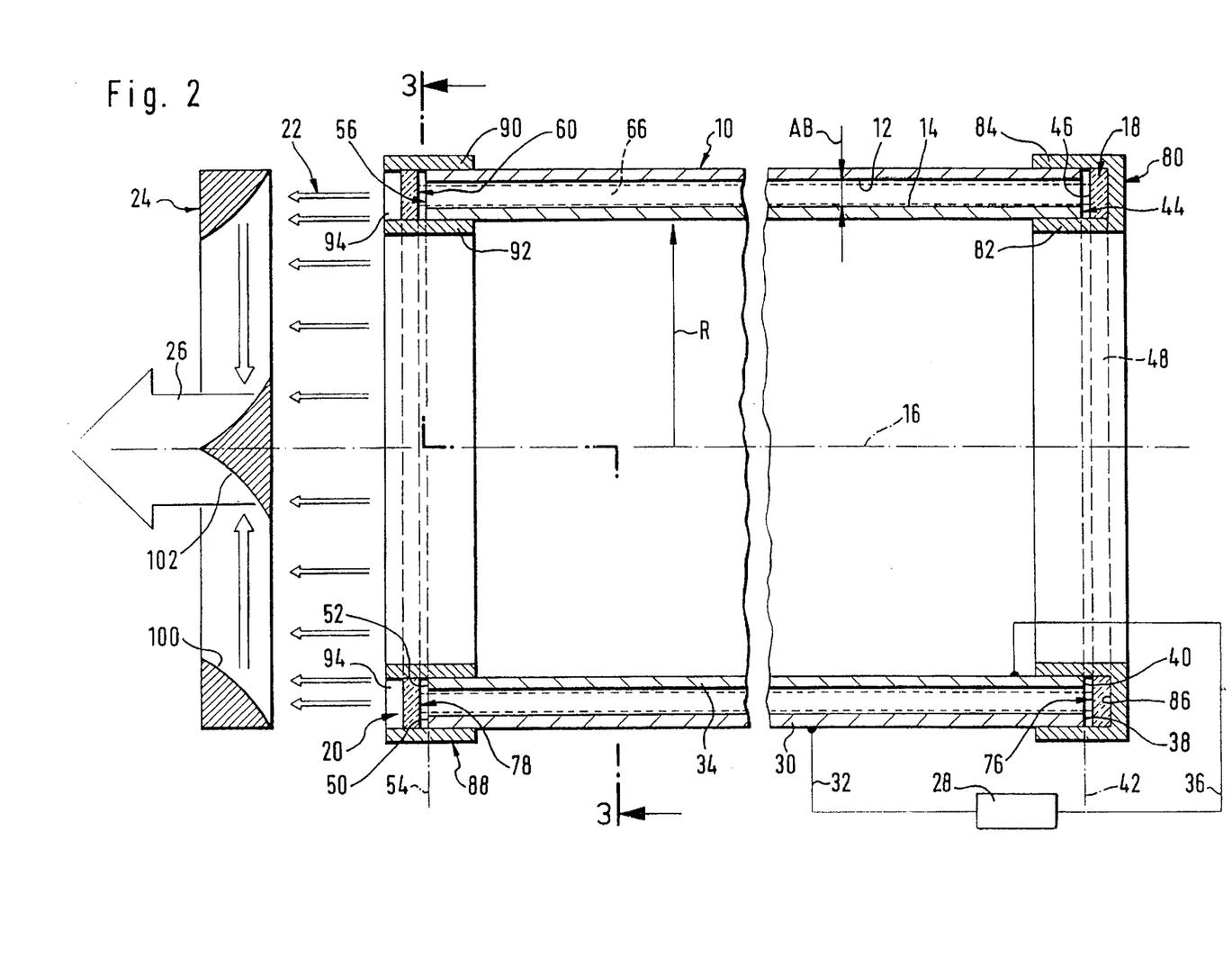
FIG. 2 shows a section along line 2—2 in FIG. 1.

As shown in detail in FIG. 2, the outer waveguide surface 12 is supported by an outer cylinder wall 30, which is preferably the wall of a metal cylinder which is directly connected to the high-frequency source 28 via a line 32 and acts as external electrode.

Similarly, the inner waveguide surface 14 is supported by an inner cylinder wall 34, likewise the wall of a metal cylinder, which is in turn connected to the high-frequency source 28 via a line 36.

As is also shown in detail in FIG. 2, first ends 38 and 40 of the cylinder walls 30 and 34 respectively lie in one plane 42 and form a first face 44 of the waveguide 10.

This first face 44 of the waveguide 10 faces the first cavity mirror 18 with a circular ring-shaped reflecting region 46 so that a full reflection of the radiation is directed from the waveguide 10 to this face by reflection back and forth to the cylindrical waveguide surfaces 12 and 14.

In this case, the first cavity mirror 18 is preferably formed by a ring 48 made of a carrier material which supports the circular ring-shaped reflecting region.

A second end 50 and 52 respectively of the outer cylinder wall 30 and inner cylinder wall 34 is located opposite each first end and is also arranged in a plane in which a second face 56 of the waveguide 10 is located.

Figure 3:
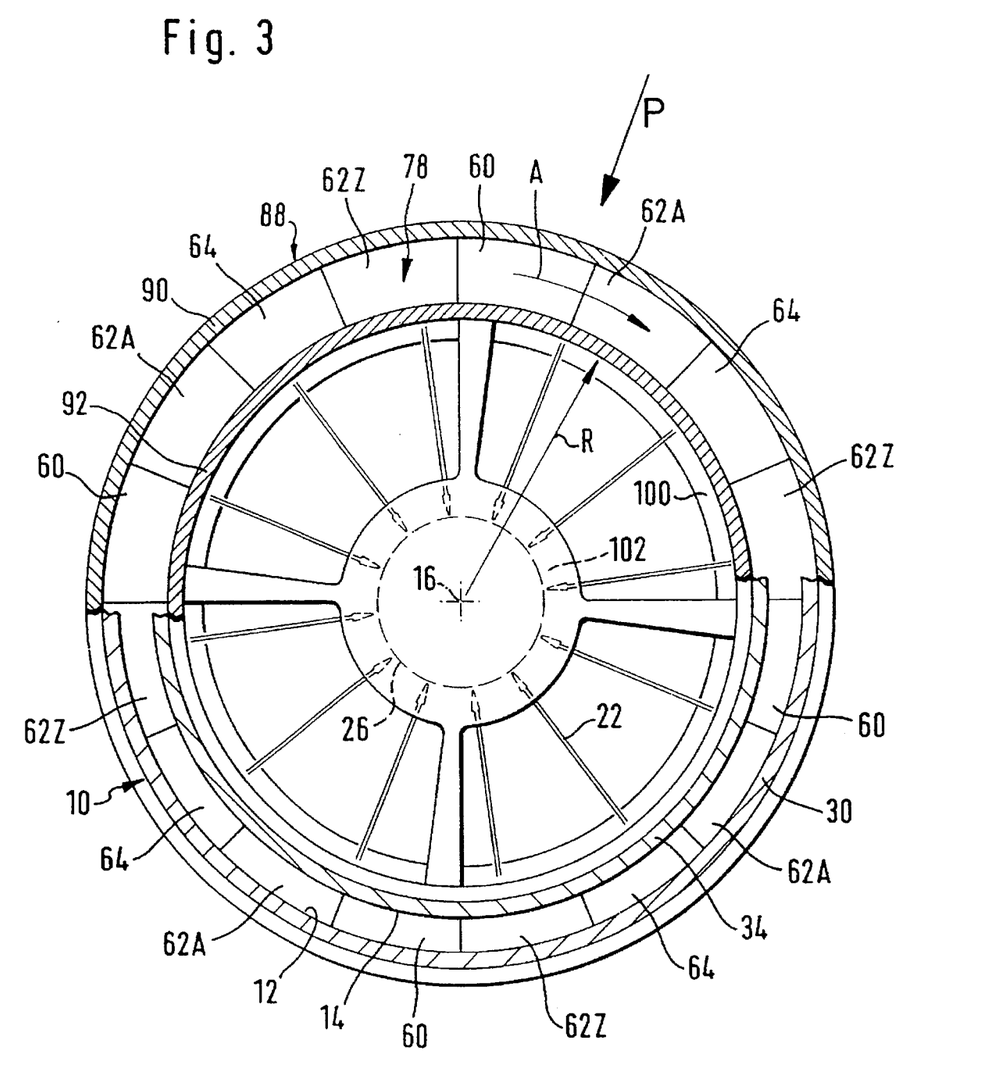
FIG. 3 shows a section along line 3—3 in FIG. 2.

As already described, the second cavity mirror 20 is arranged to face this and has a varying curve of reflectivity RE in the azimuthal direction A, and in this case, as shown in particular in FIG. 3, has a plurality of maximum reflecting regions 60 arranged in succession in an azimuthal direction A, intermediate regions 62A with decreasing reflectivity RE, minimum reflecting regions 64 and intermediate regions 62Z with increasing reflectivity RE, which succeed one another periodically and which extend in radial direction R relative to the cylinder axis 16 over the distance B between the cylindrical waveguide surfaces 12 and 14.

Figure 4:
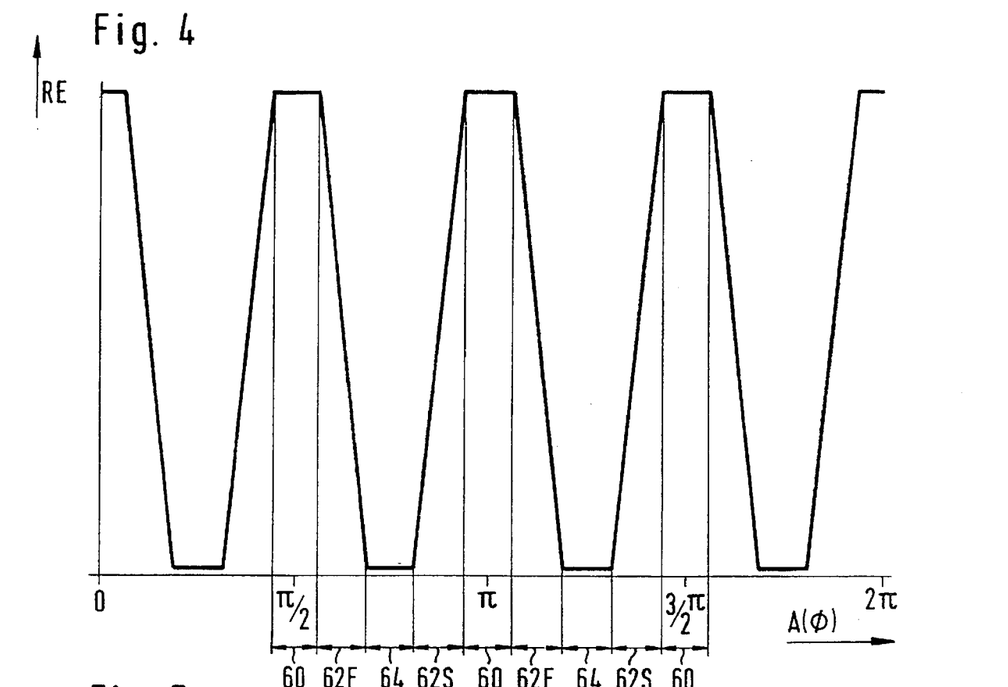
FIG. 4 is a diagram of the variation in reflectivity of the first cavity mirror in a projection of the azimuthal direction giving the azimuth angle.

In this case, the maximum reflecting regions 60, the intermediate regions 62A and 62Z and the minimum reflecting regions 64 recur with such periodicity in the azimuthal direction A that an integral multiple of the period corresponds exactly to one rotation in the azimuthal direction A, so that on the second rotation the periods recur congruently, as is shown in FIG. 4. FIG. 4 shows the position of the individual regions 60, 62 and 64 in relation to the azimuth angle about axis 16.

Figure 5:
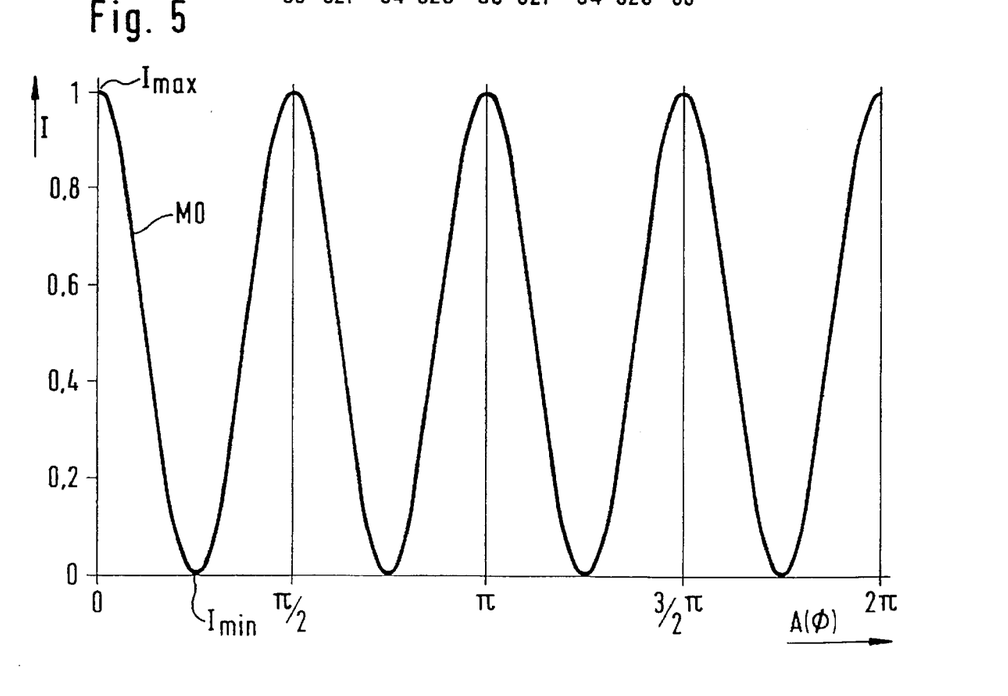
FIG. 5 shows the intensity curve of the selected mode in relation to the azimuthal direction giving the azimuth angle.

The position of the location of regions 60, 62 and 64 in the solution according to the invention is fixed by maximum intensity values $I_{max}$ and minimum intensity values $I_{min}$ of the intensity distribution of a selected mode MO of the laser resonator 19, shown in FIG. 5.

The maximum reflecting regions 60 in this case are arranged so that the maximum intensity values $I_{max}$ and minimum intensity values $I_{min}$ are located inside these, preferably in the centre thereof, and the minimum reflecting regions 64 are arranged so that the minimum intensity values $I_{min}$ are located inside them, likewise preferably in the centre thereof.

Therefore, the periodicity of the maximum reflecting regions 60, the intermediate regions 62A and 62Z and the minimum reflecting regions 64 in the azimuthal direction A is identical to the periodicity of the intensity curve of the selected mode MO in the azimuthal direction A.

The arrangement according to the invention of maximum reflecting regions 60 and minimum reflecting regions 64 as well as intermediate regions 62A and 62Z of the cavity mirror 20 allows the selected mode MO to stabilise in the laser resonator 19, and other modes can be suppressed to a greater or lesser degree so that a resonator radiation field 66 forming in the laser resonator 19 essentially encompasses the selected mode MO.

The output of laser radiation forming the laser beam bundle 22 from the resonator radiation field 66 in this case occurs in the intermediate regions 62F and 62S and the minimum reflecting regions 64, whereas in the maximum reflecting regions 60, substantially full reflection of the mode MO encompassed by the laser radiation field occurs.

The output laser radiation then forms the laser beam bundle 22, which can be recombined to the coaxial laser beam bundle 26 by means of imaging optics 24.

Figure 6:
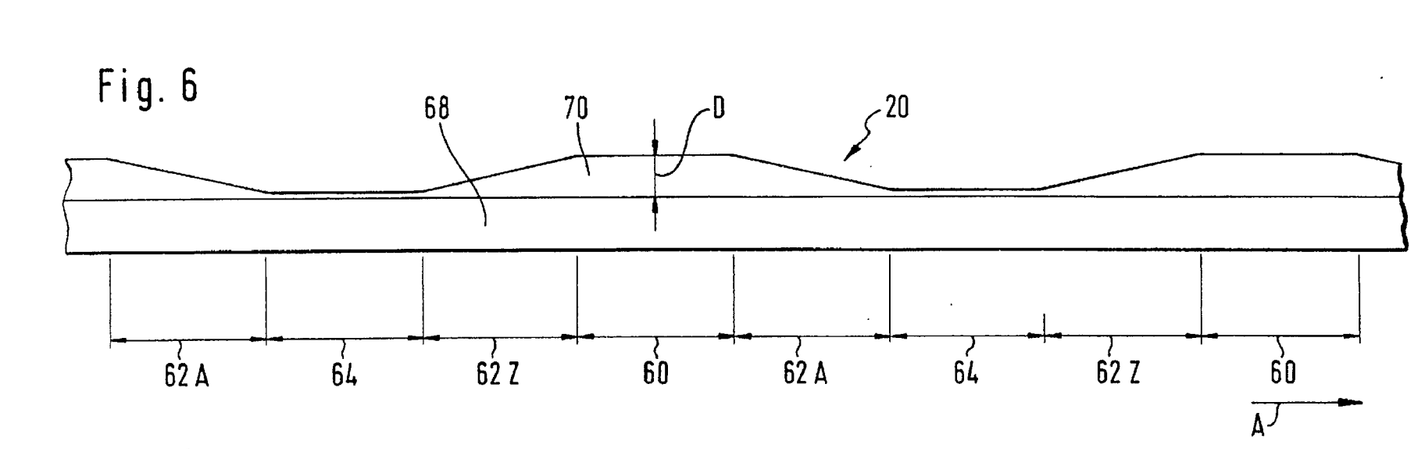
FIG. 6 is a sectional diagram of a top view in the direction of arrow P in FIG. 3.

In this case, the cavity mirror 20, shown in projection in FIG. 6, is constructed so that it comprises a substrate 68, onto which a layer 70 is applied, e.g. by metallisation. This layer 70 is composed of a high-index dielectric, e.g. germanium, whereas the substrate is a transparent material. The reflectivity at the various locations may then be adjusted in the azimuthal direction A by varying the thickness D of the layer 70.

The manufacture of such a mirror is known, for example, from the article by Lavigne, McCarthy and Demers in the journal APPLIED OPTICS, Vol. 24, No. 16, pages 2581 to 2586.

Figure 7:
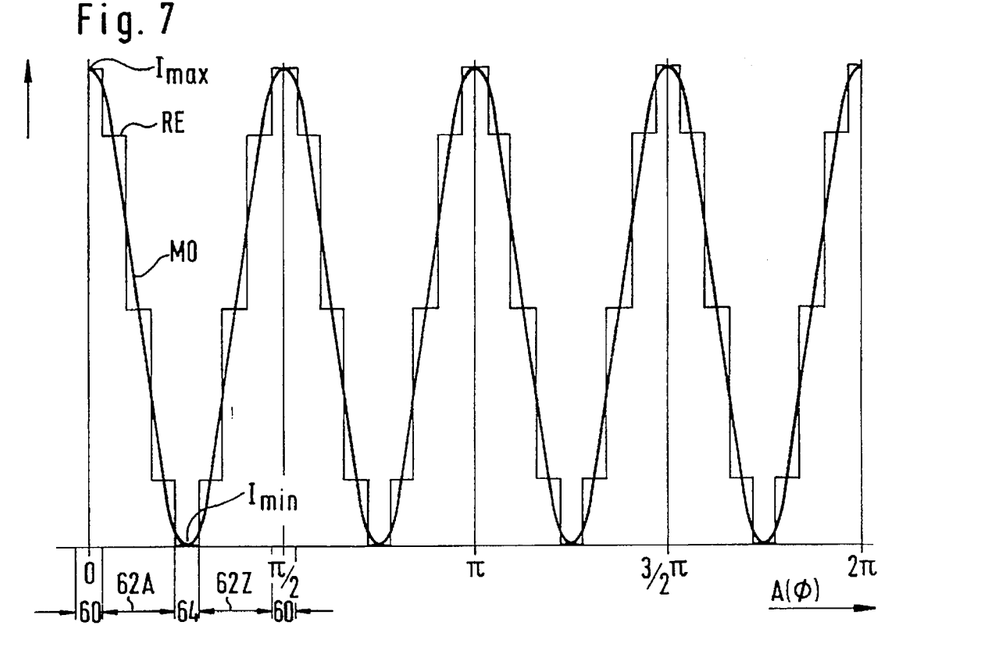
FIG. 7 shows the curve of the reflectivity of the first cavity mirror similar to FIG. 4 together with the intensity curve of the selected mode in projection of the azimuthal direction in a second embodiment.
Figure 8:
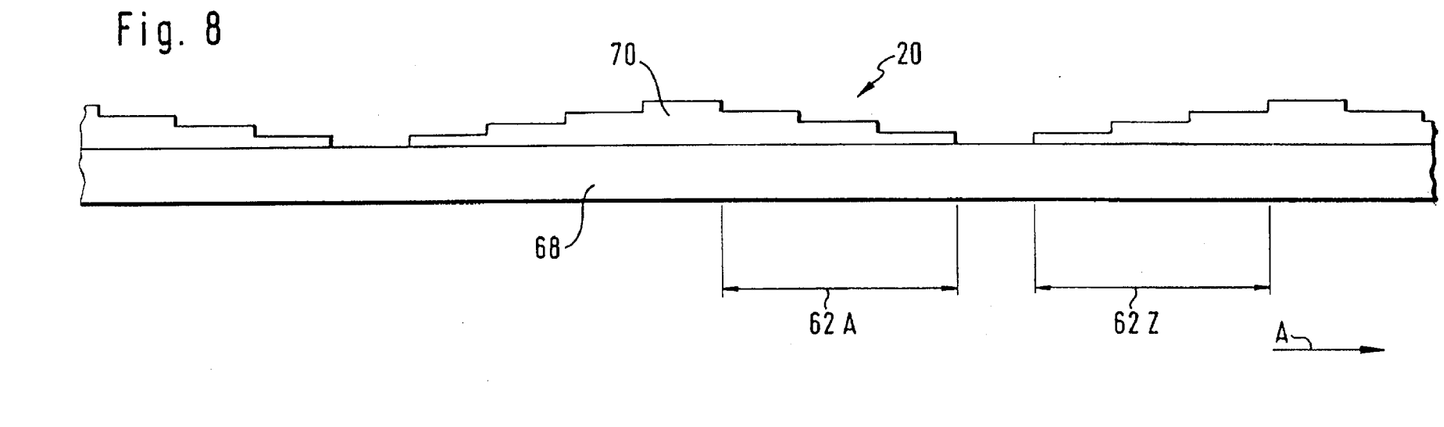
FIG. 8 is a top view similar to FIG. 6 onto the first cavity mirror of the second embodiment.

A second embodiment of a laser according to the invention has principally the same structure as the first embodiment, except that the reflectivity RE in the intermediate regions 62A decreases in steps, or in intermediate regions 62Z increases in steps, as shown in FIG. 7. As shown in FIG. 8, this can be achieved by the simplest means by the fact that the thickness of the layer 70 on the substrate 68 in the intermediate regions 62A and 62Z varies in steps. As is also shown in FIG. 7, the position of the steps in this case adapted to the intensity distribution curve of the selected mode so that the selected mode may likewise be selected with a reflectivity of the cavity mirror 20 varying in such a manner in the azimuthal direction A.

Reference is made here to the full details of the description of the first embodiment.

Figure 9:
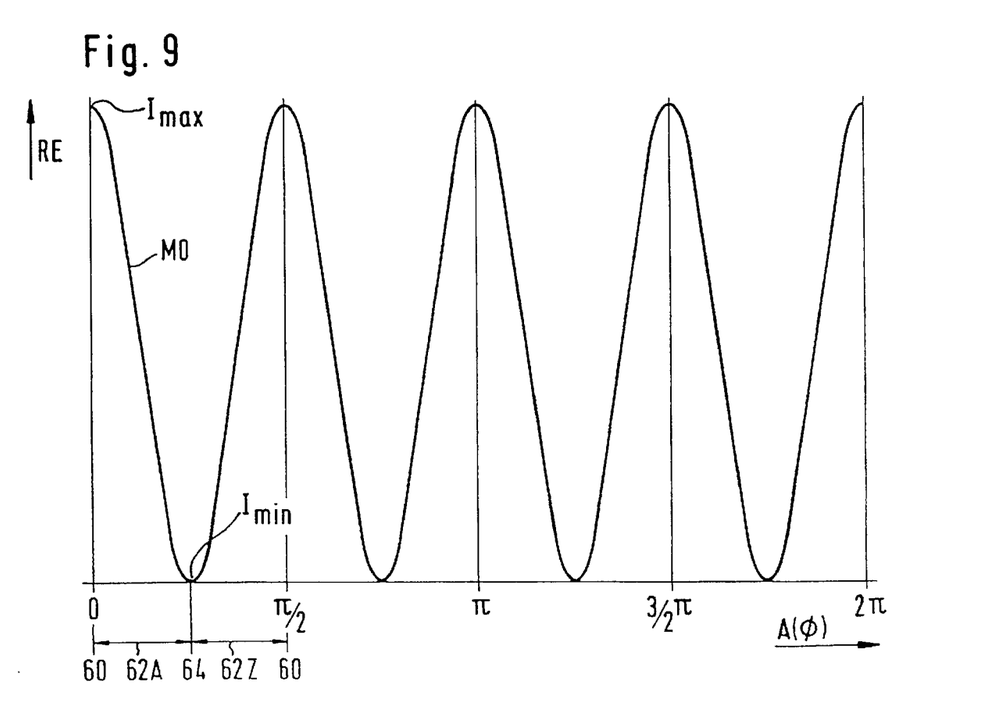
FIG. 9 shows the curve of the reflectivity of the first cavity mirror in a third embodiment similar to FIG. 4.

An even more ideal mode selection can be achieved in a third embodiment if, as shown in FIG. 9, the reflectivity RE has the same curve as the intensity of mode MO, and therefore the maximum reflecting regions 60, viewed solely in the azimuthal direction A, occur at the location of the maximum intensity $I_{max}$ of the mode, and the minimum reflecting regions 64 only lie at the location of the minimum intensity $I_{min}$ of the mode MO, and the intermediate regions 62A and 62Z, in which the reflectivity RE also has the same curve in the azimuthal direction A as intensity I of the mode MO, lie between the maximum reflecting regions 60 and the minimum reflecting region 64.

In this third embodiment, laser radiation is also output in the intermediate regions 62A and 62Z through the cavity mirror 20, whereas essentially no illumination is output in the minimum reflecting regions 64, since the intensity minimum $I_{min}$ of the intensity curve of mode MO coincides with these.

Figure 10:
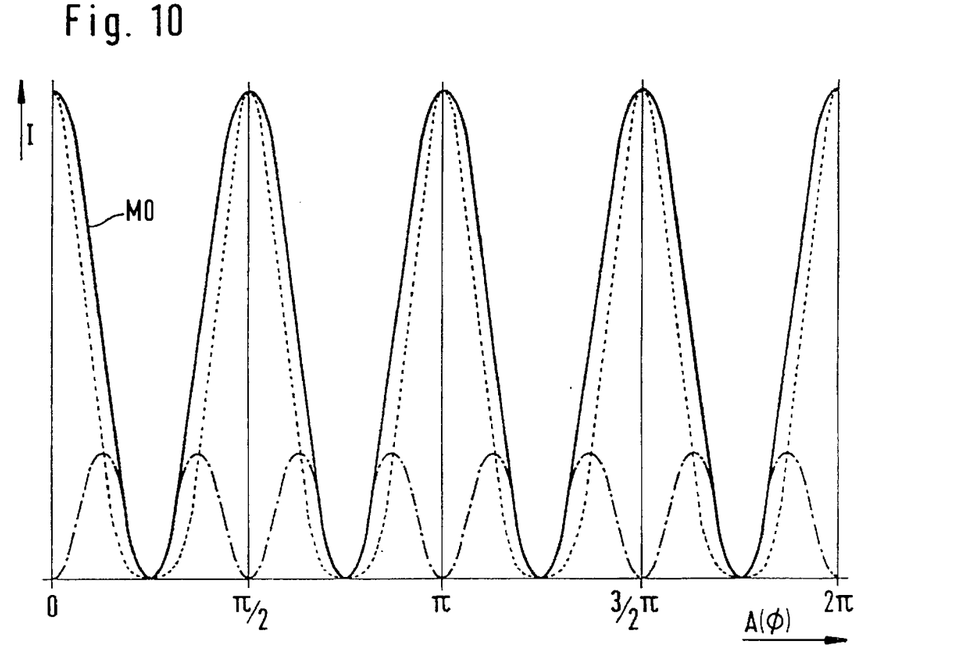
FIG. 10 shows the intensity curve of the selected mode (shown in solid lines) in projection of the azimuthal direction in a third embodiment and of the reflected component of the resonator radiation field (shown in dotted lines) as well as of the transmitted component, and thus output component, of the resonator radiation field (shown in dot-dash lines) in the third embodiment.

In FIG. 10, the reflected intensity is shown in dotted lines beside the intensity curve I of the mode MO and the intensity output by cavity mirror 20 is shown in dot-dash lines. It is evident here that output of laser radiation from the resonator radiation field 66 essentially occurs in the intermediate regions 62A and 62Z.

Figure 11:
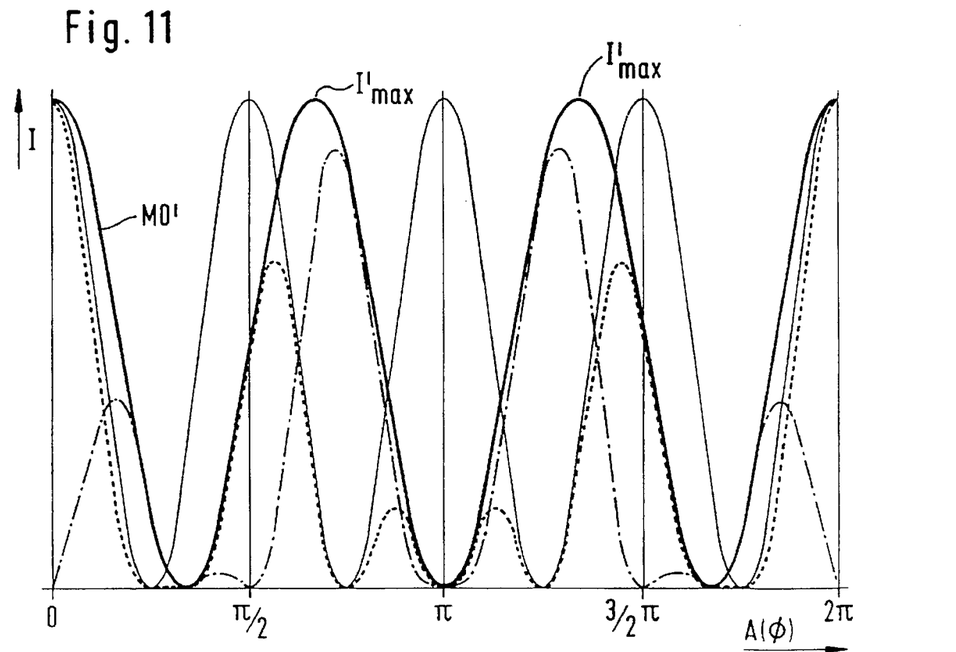
FIG. 11 is a diagram of a lower mode (shown in bold solid lines) in comparison to the selected mode (shown in faint solid lines) and of the reflected components thereof (shown in dotted lines) as well as of the transmitted components thereof (shown in dot-dash lines) in a reflectivity curve according to FIG. 9 of the third embodiment.

As shown in FIG. 11, those modes, which have a higher or lower order than the selected mode MO, can be suppressed in such an intensity curve of the cavity mirror 20, since their maximum intensity values $I_{max}$ are only reflected to a substantially reduced degree and a considerable part of the modes is output in the intermediate regions 62A and 62Z.

Figure 12:
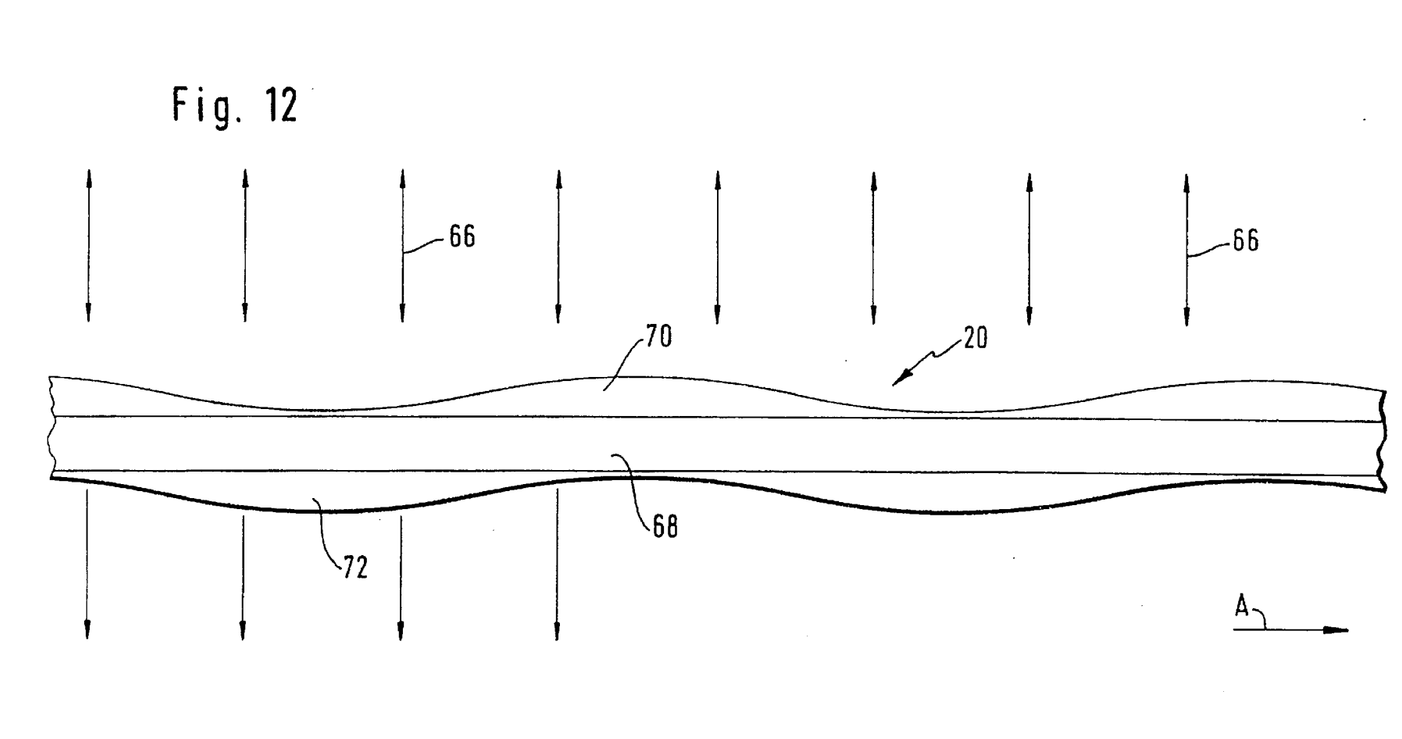
FIG. 12 shows a top view onto the mirror similar to FIG. 6 in the third embodiment.

In the third embodiment, the layer 70 applied to the substrate 68 is constructed in such a way that it varies continuously in its thickness D in keeping with the periodicity to cause a continuous variation in reflectivity RE of the cavity mirror 20, as shown in FIG. 12.

Since the layer 70, which has a variable thickness for variation of the reflectivity RE, can also lead to phase distortions varying differently with the azimuthal direction A because of its variable thickness, a compensation layer 72 is also applied to the opposite side of the substrate to layer 70 to compensate again the phase distortions generated by the varying thickness of layer 70. In this case, the thickness of the compensation layer 72 is dimensioned so that the laser radiation forming the laser beam bundle 22 exiting from the laser resonator 19 through the mirror 19 has at each point exactly the same phase position, which corresponds with the phase position of the resonator radiation field 66 in the laser resonator 19 with the selected mode MO.

Figure 13:
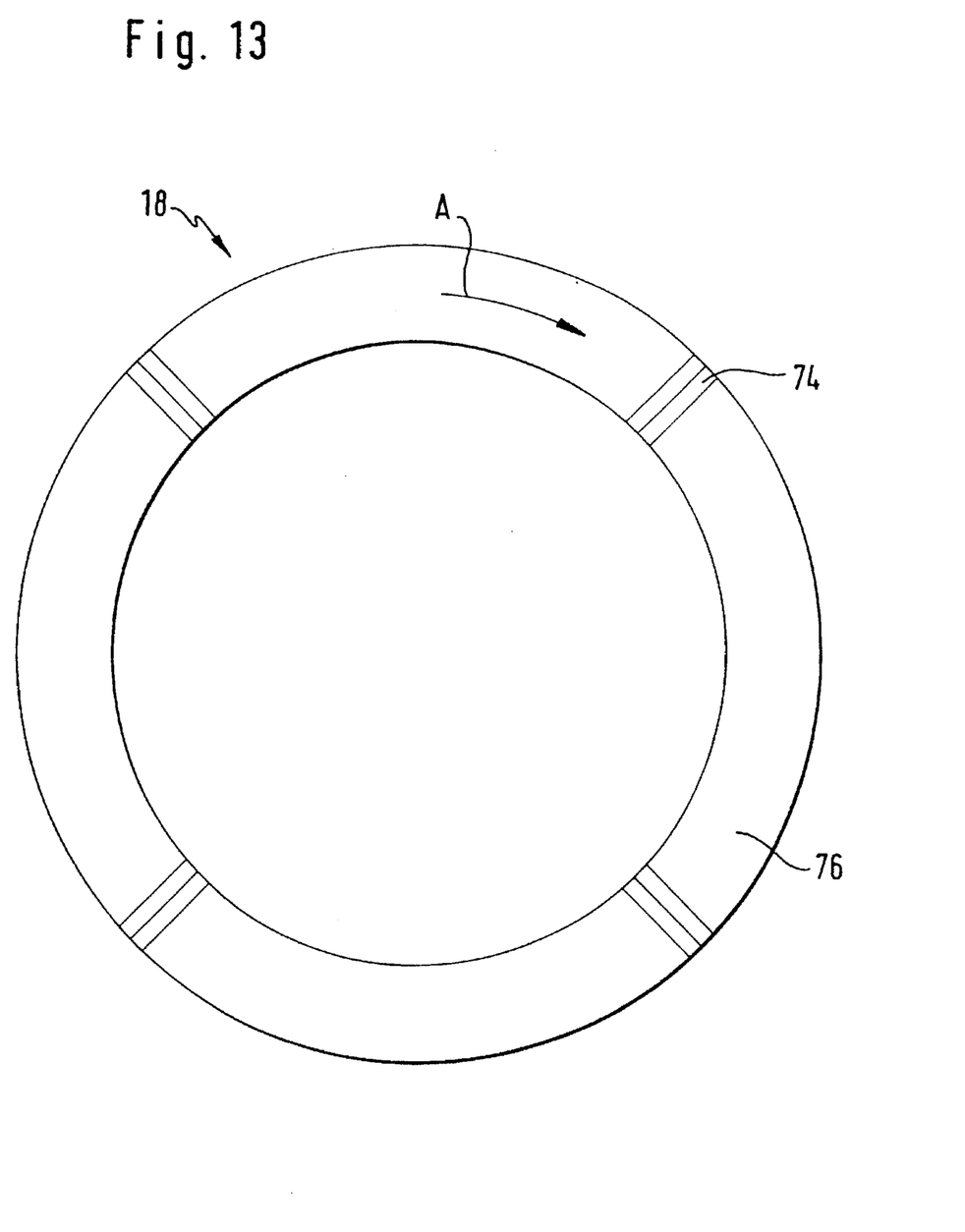
FIG. 13 shows a top view onto the second cavity mirror of the third embodiment.

Moreover, as shown in FIG. 13, the third embodiment also provides that while the cavity mirror 18 as a whole is fully reflecting, it is provided with regions 74 of reduced reflectivity, which are located in the azimuthal direction A in precisely those locations in which the selected mode MO has minimum intensity values in the region of the cavity mirror 18. Hence, the regions 74 allow a further increase in mode selection in the laser resonator 19 according to the invention.

Otherwise, the third embodiment is of the same construction as the first, and therefore reference is made here to the full details given in the description of the first embodiment.

Figure 14:
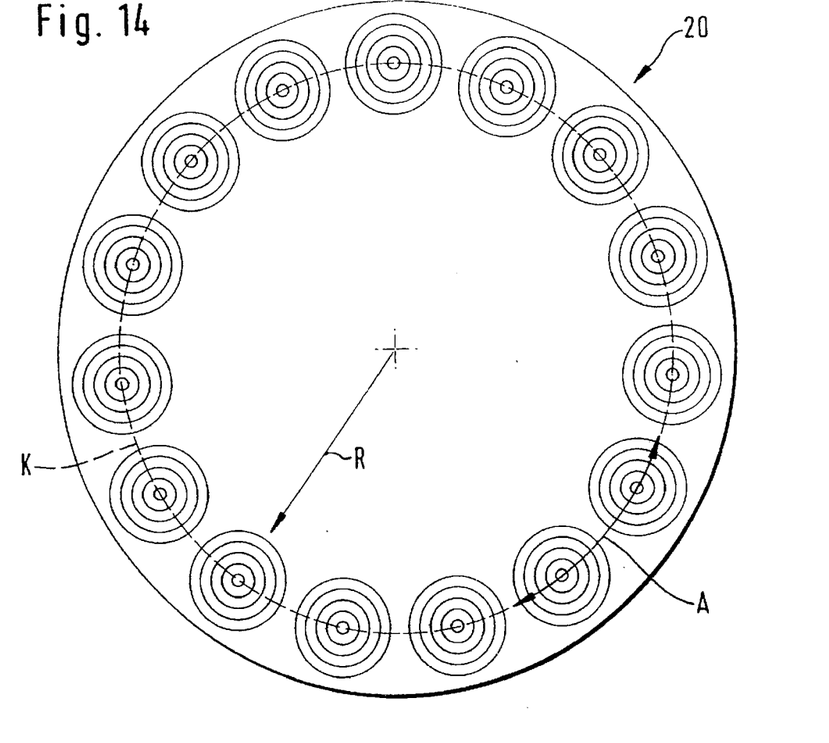
FIG. 14 shows a top view onto the cavity mirror similar to FIG. 3 of a fourth embodiment.
Figure 15:
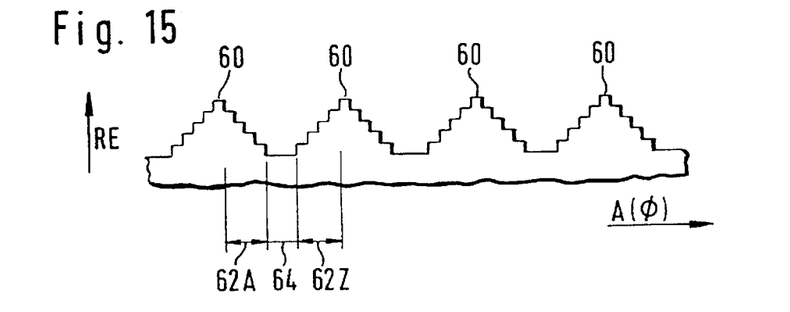
FIG. 15 shows a sectional view of the reflectivity curve in the azimuthal direction on the circle K in FIG. 14 in the fourth embodiment in projection.
Figure 16:
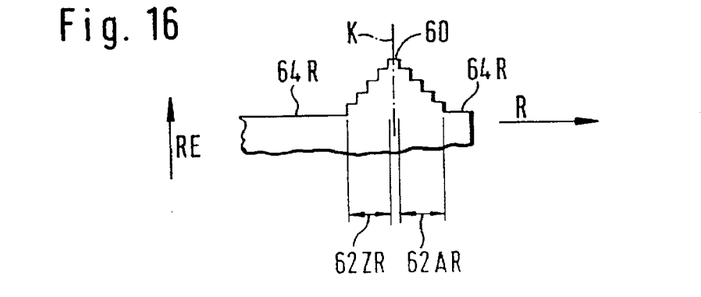
FIG. 16 is a sectional view of the reflectivity curve in the area of circle K in the radial direction in the fourth embodiment.

In a fourth embodiment shown in FIGS. 14 to 16, the reflectivity of the cavity mirror 20 in the azimuthal direction A, like in the second embodiment shown in FIGS. 7 and 8, varies in steps, as is also shown in FIG. 15 in the projection of circular arc K in relation to the azimuthal direction A.

In addition, as shown in FIG. 16, the reflectivity also varies in the radial direction R, i.e. working from a minimum value 64 R located radially inside the circle K relative to a radial intermediate region 62ZR to the maximum value 60 located on the circle K, and then relative to the radial intermediate region 62AR to the minimum value 64R radially outside the circle K, so that the overall pattern of reflectivity of the cavity mirror 20 shown in FIG. 14 results with circle K, viewed in the radial direction, preferably lying in the centre between the waveguide surfaces 12 and 14.

Such a variation in reflectivity RE in radial direction R enables an even more precise selection of the selected mode MO, since it is also possible to select those modes which have maximum intensity values located in a different location in radial direction to the maximum intensity values which coincide with the maximum and minimum reflectivity values in radial direction.

Otherwise, the fourth embodiment is of the same construction as the second and first embodiments, and therefore reference is made here to the full details given in the description of these embodiments.

In all the embodiments, the reflecting surfaces 76 and 78 of the cavity mirrors 18 and 20 are preferably constructed, with respect to the direction of reflection, as plane surfaces reflecting back in the same direction and running parallel to the planes 42 and 54 respectively. These constitute the simplest boundary conditions for the selection of a mode in the laser resonator 19 according to the invention.

Moreover, in all the embodiments, the reflectivity of the cavity mirror 20 extends constantly in radial direction R in the simplest case. In the case of specially selected modes, a further variation in radial direction is additionally provided for variation in the azimuthal direction A.

In addition, in all the embodiments of the solution according to the invention, the selected modes are selected according to the formulae for field distribution in a waveguide, as described, for example, in the book by N. Markuvitz, Waveguide Handbook, McGraw-Hill, New York, Toronto, London 1951, page 78 et seq., in particular in equation 43.

In the laser resonators according to the invention, $H_{mn}$ modes are preferably employed as selected modes, since these clearly have lower losses than $E_{mn}$ or TEM modes.

To position the outer cylinder wall 30 and the inner cylinder wall 34 at a distance AB from one another in a defined and stable manner in the solution according to the invention, a retaining ring 80 is provided on the first face which with the inside shoulder 82 acts as an inner support for the inner cylinder wall 34, and with the outside shoulder 84 acts as an outer support for the outer cylinder wall 30. The retaining ring 80 additionally holds the first cavity mirror 18 in a recess 86 provided for it.

At their second ends 50 and 52, the cylinder walls 30 and 34 are fixed relative to one another by U-shaped brackets 88, and said brackets 88 are connected to their side arms 90 and 92 with the outsides and insides respectively of the cylinder walls 30 and 34 respectively, and with a central arm 94 each engage over a reflecting segment 60 on the rear side averted from its reflection surface 78.

The brackets 88 are preferably also constructed as support elements for fixture of the reflecting segments 60 and thus hold these with their reflection surfaces 68 aligned parallel to the plane 54.

The axicon 24 changing the laser beam bundle 22 into laser beam bundle 26 preferably has an outer convex toroidal surface 100 arranged coaxially to the cylinder axis 16, and an inner toroidal surface 102 also arranged coaxially to the cylinder axis 16.

We claim:

1. A waveguide laser, comprising:
   a laser-active medium,
   a pump source for the laser-active medium and a resonator with a waveguide extending in an axial direction, said resonator comprising first and second cavity mirrors spaced in said axial direction,
   said waveguide being formed from a cylindrical, outer optical waveguide surface and a cylindrical, inner optical waveguide surface, wherein:
   a resonator radiation field extends between said mirrors and through said waveguide, said radiation field comprising a selected resonator mode with maximum intensity values and minimum intensity values evenly distributed in an azimuthal direction within said waveguide;
   part of said resonator radiation field is coupled out of said resonator through said first mirror to provide an output radiation field; and
   said first mirror comprises a varying reflectivity with successive regions having maximum, intermediate and minimum reflectivity values in said azimuthal direction, with the regions having maximum reflectivity residing at locations of said maximum intensity value of said selected mode and the regions having minimum reflectivity residing at locations of said minimum intensity value of said selected mode, such that the selected resonator mode in said resonator is stabilized and thereby preferred with respect to other modes of said laser radiation field.

2. Waveguide laser according to claim 1, characterised in that the reflectivity in the intermediate regions has intermediate values forming at least one step.

3. Waveguide laser according to claim 1, characterised in that the reflectivity in the intermediate regions has intermediate values which decrease in a transition from one of the maximum values to one of the minimum values, or increase in the transition from one of the minimum values to one of the maximum values.

4. Waveguide laser according to claim 3, characterised in that the intermediate values form successive steps.

5. Waveguide laser according to claim 3, characterised in that the intermediate values decrease or increase continuously.

6. Waveguide laser according to claim 3, characterised in that the intermediate values decrease or increase with constant slope.

7. Waveguide laser according to claim 3, characterised in that the intermediate values constantly decrease or increase.

8. Waveguide laser according to claim 7, characterised in that the reflectivity in the azimuthal direction extends in the form of a periodic function between the maximum values and the minimum values.

9. Waveguide laser according to claim 8, characterised in that the locations of the maximum values and the locations of the minimum values lie at the maximum values and minimum values of the periodic function.

10. Waveguide laser according to claim 1, characterised in that the reflectivity has the same curve in the azimuthal direction as the intensity of the selected mode of the resonator.

11. Waveguide laser according to claim 1, characterised in that an output of laser radiation from the resonator radiation field is achieved in the intermediate regions.

12. Waveguide laser according to claim 11, characterised in that the output of laser radiation from the resonator radiation field occurs in the location of the maximum value.

13. Waveguide laser according to claim 1, characterised in that the maximum values and minimum values of the reflectivity of the first cavity mirror, viewed in the radial direction, are arranged at the location of the maximum intensities and minimum intensities of the selected mode of the resonator.

14. Waveguide laser according to claim 13, characterised in that radial intermediate regions, in which the reflectivity is located between the maximum value and the minimum value, extend in the radial direction between the successive maximum values and minimum values.

15. Waveguide laser according to claim 14, characterised in that the reflectivity in the intermediate regions has intermediate values forming at least one step.

16. Waveguide laser according to claim 14, characterised in that the reflectivity in the intermediate regions has intermediate values, which decrease in a transition from one of the maximum values to one of the minimum values or increase in the transition from one of the minimum values to one of the maximum values.

17. Waveguide laser according to claim 16, characterised in that the radial intermediate values form successive steps.

18. Waveguide laser according to claim 16, characterised in that the intermediate values decrease or increase continuously.

19. Waveguide laser according to claim 16, characterised in that the radial intermediate values decrease or increase with a constant slope.

20. Waveguide laser according to claim 16, characterised in that the radial intermediate values decrease or increase constantly.

21. Waveguide laser according to claim 1, characterised in that the first cavity mirror comprises a substrate, onto which a high-index dielectric is applied as a layer, in which case the reflectivity may be varied by variation of the thickness of the layer.

22. Waveguide laser according to claim 21, characterised in that the first cavity mirror is provided with a phase-compensating layer which compensates a phase distortion on the basis of the varying reflectivity.

23. Waveguide laser according to claim 1, characterised in that the second cavity mirror is a fully reflecting mirror.

24. Waveguide laser according to claim 1, characterised in that the second cavity mirror has high-loss regions at the location of minimum intensity values of the selected mode.

* * * * *